(12) United States Patent
Seidel

(10) Patent No.: US 7,877,944 B2
(45) Date of Patent: Feb. 1, 2011

(54) TOWER FOUNDATION, IN PARTICULAR FOR A WIND ENERGY TURBINE

(75) Inventor: Marc Seidel, Osnabrueck (DE)

(73) Assignee: General Electric Company, Schenectady, NY (US)

( * ) Notice: Subject to any disclaimer, the term of this patent is extended or adjusted under 35 U.S.C. 154(b) by 163 days.

(21) Appl. No.: 10/565,747

(22) PCT Filed: Aug. 9, 2003

(86) PCT No.: PCT/EP03/08871

§ 371 (c)(1),
(2), (4) Date: Aug. 29, 2006

(87) PCT Pub. No.: WO2005/015013

PCT Pub. Date: Feb. 17, 2005

(65) Prior Publication Data

US 2007/0006541 A1    Jan. 11, 2007

(30) Foreign Application Priority Data

Aug. 9, 2003    (WO) ............... PCT/EP03/00871

(51) Int. Cl.
*E02D 27/32*    (2006.01)
(52) U.S. Cl. ............... 52/296; 52/297; 52/40
(58) Field of Classification Search ......... 52/40,
52/726.3, 726.4, 296–297, 334, 253, 218,
52/219, 223.5, 295, 432, 649.2, 848, 745.12,
52/745.18, 745.17; 416/DIG. 6; 171/45,
171/45 R; 343/875; 174/45 R
See application file for complete search history.

(56) References Cited

U.S. PATENT DOCUMENTS 3,473,279 A    10/1969    Saiko et al.
3,561,890 A *   2/1971    Peterson ............... 417/336

(Continued)

FOREIGN PATENT DOCUMENTS

DE    2831255 A    1/1980

(Continued)

OTHER PUBLICATIONS

PCT Notification of Transmittal of the International Search Report or the Declaration, PCT/EP03/08871, Mar. 3, 2004, 7 pages.

*Primary Examiner*—Brian E Glessner
*Assistant Examiner*—James J Buckle, Jr.
(74) *Attorney, Agent, or Firm*—Blakely, Sokoloff, Taylor & Zafman LLP

(57) ABSTRACT

A tower, in particular for a wind energy turbine, comprises a first tower segment (18) having a wall (20) comprising concrete material and a second tower segment (26) having a wall (28) comprising steel. The wall (28) of the second tower segment (26) comprises an end portion (30) embedded in an embedent portion (32) of the wall (20) of the first tower segment (18). The second tower segment (26) within its embedded end portion (30) comprises at least one anchoring element (38, 40, 52) projecting radially from an inner or an outer surface (42, 44) or both inner and outer surfaces (42, 44) of the wall (28) of the second tower segment (26), the anchoring elements (38, 40, 52) being arranged along an axial direction of the second tower segment (26).

16 Claims, 6 Drawing Sheets

U.S. PATENT DOCUMENTS

| | | | |
|---|---|---|---|
| 3,916,635 A * | 11/1975 | Lynch et al. | 405/253 |
| 4,217,738 A | 8/1980 | Smith | |
| 4,245,958 A * | 1/1981 | Ewers | 416/197 A |
| 4,272,929 A * | 6/1981 | Hanson | 52/40 |
| 4,406,094 A * | 9/1983 | Hempel et al. | 52/40 |
| 5,117,607 A * | 6/1992 | Bourdon | 52/732.3 |
| 5,400,737 A * | 3/1995 | Salazar | 116/174 |
| 5,426,903 A * | 6/1995 | Ramm et al. | 52/334 |
| 5,678,382 A | 10/1997 | Naito | |
| 5,878,540 A * | 3/1999 | Morstein | 52/296 |
| 6,532,700 B1 * | 3/2003 | Maliszewski et al. | 52/40 |

FOREIGN PATENT DOCUMENTS

| | | |
|---|---|---|
| WO | WO 02/27105 A | 4/2002 |
| WO | WO 2005/015013 A1 | 2/2005 |

* cited by examiner

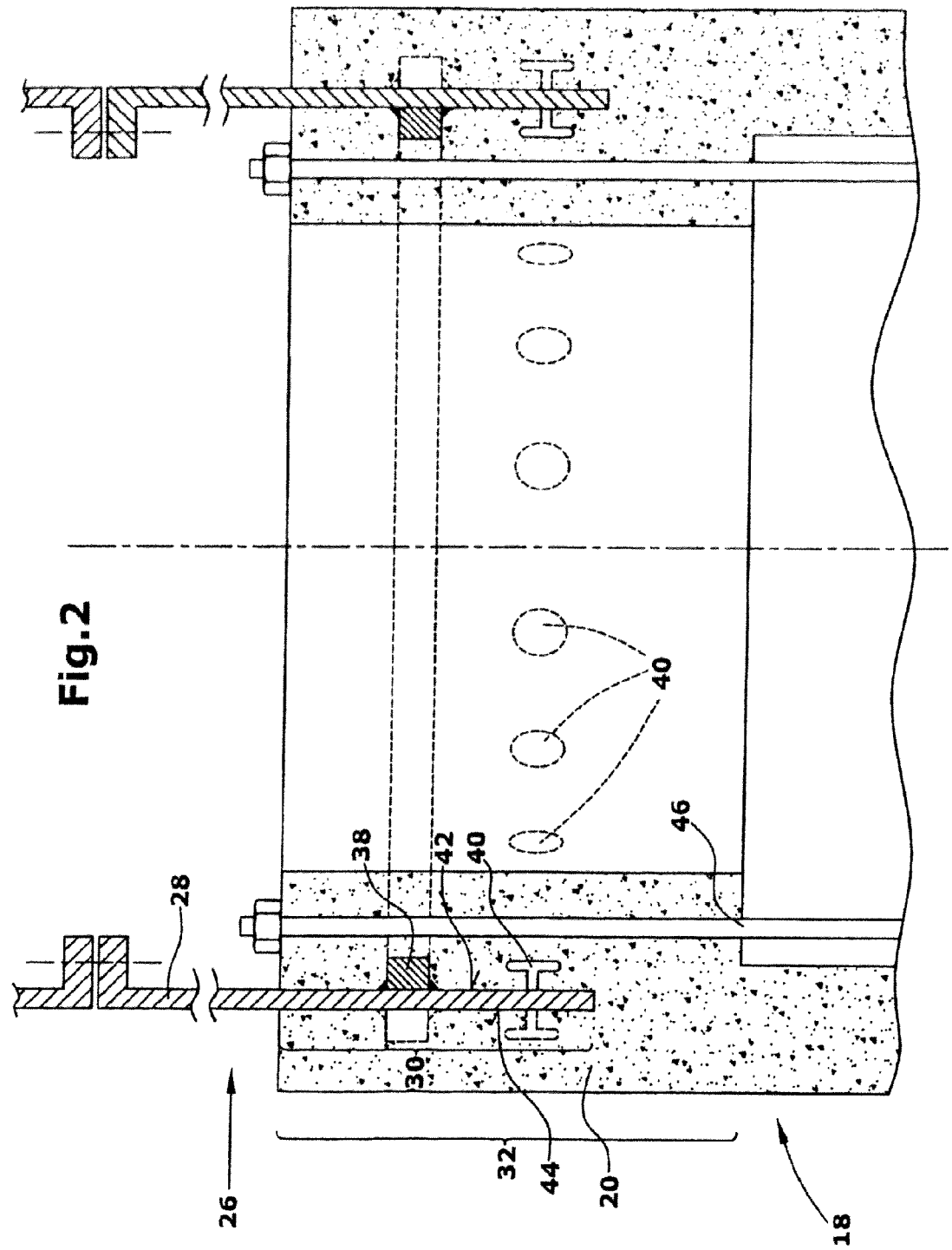

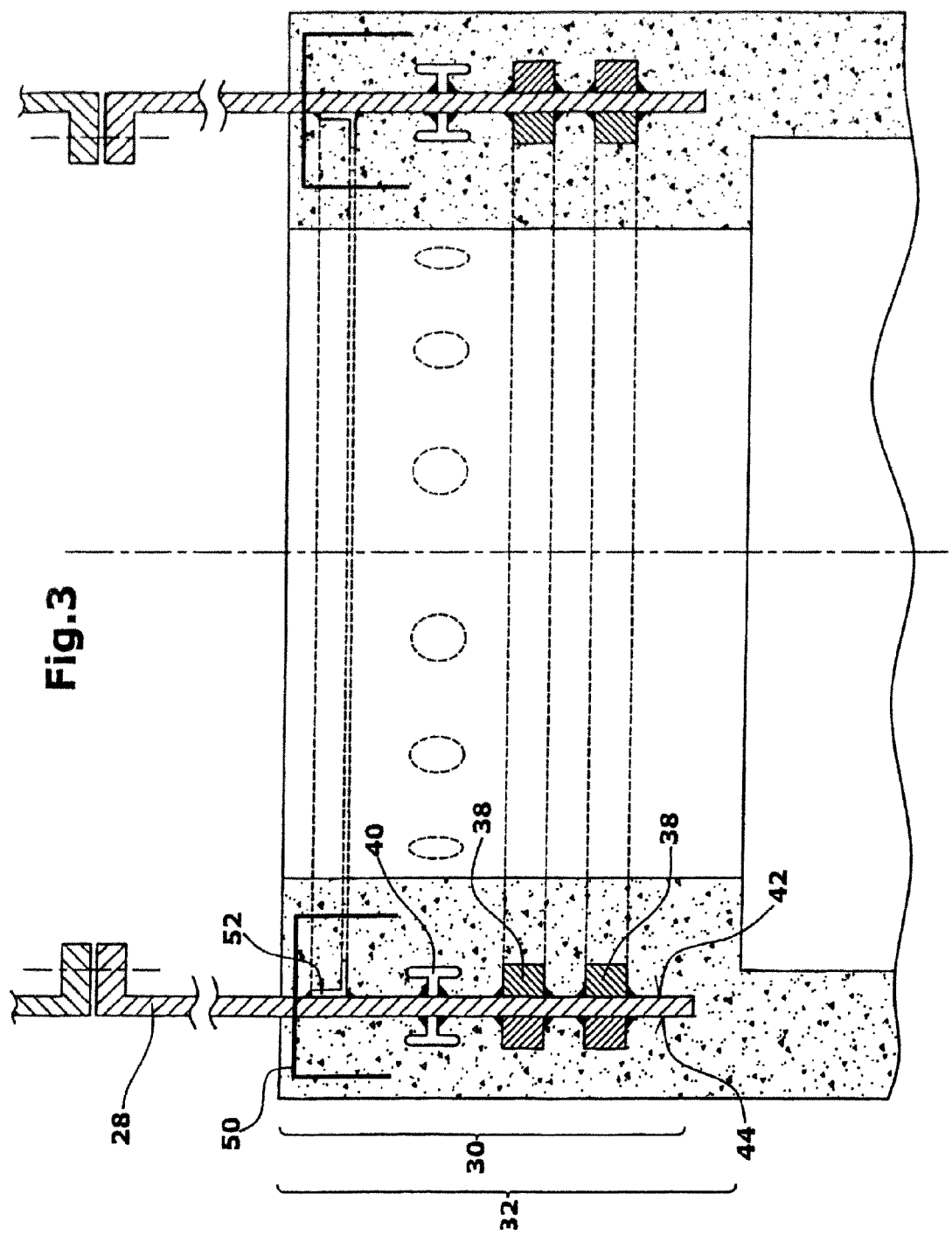

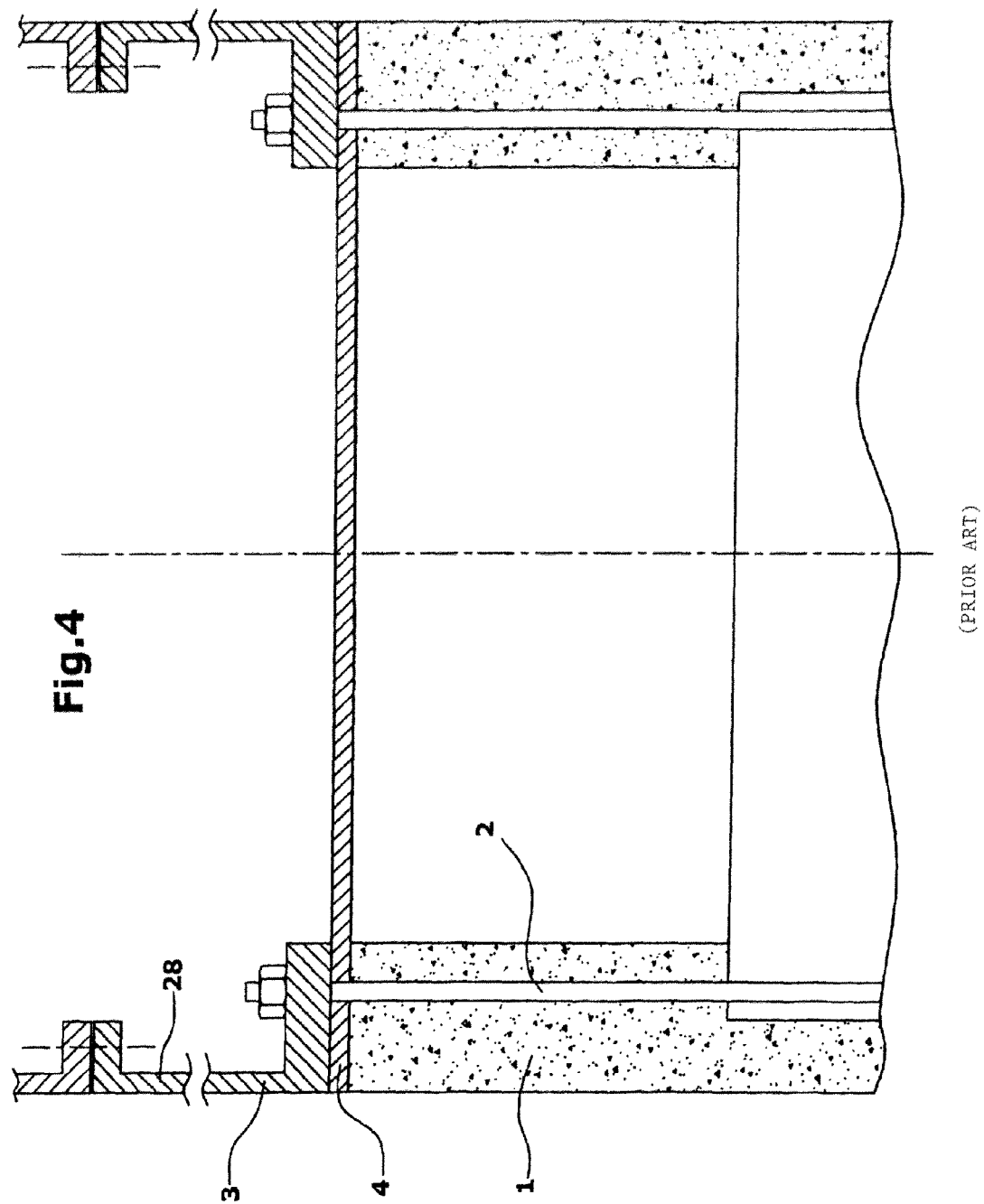

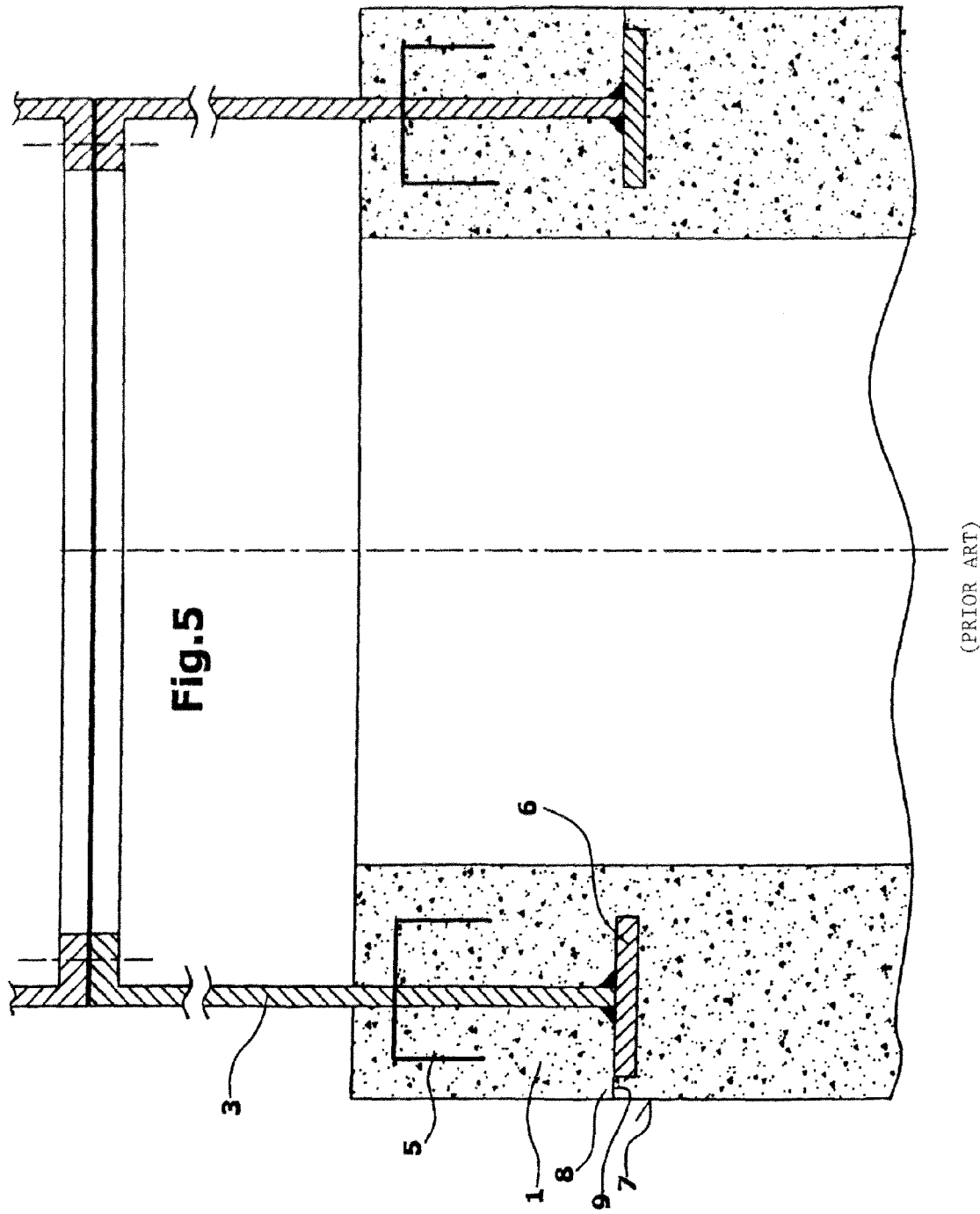

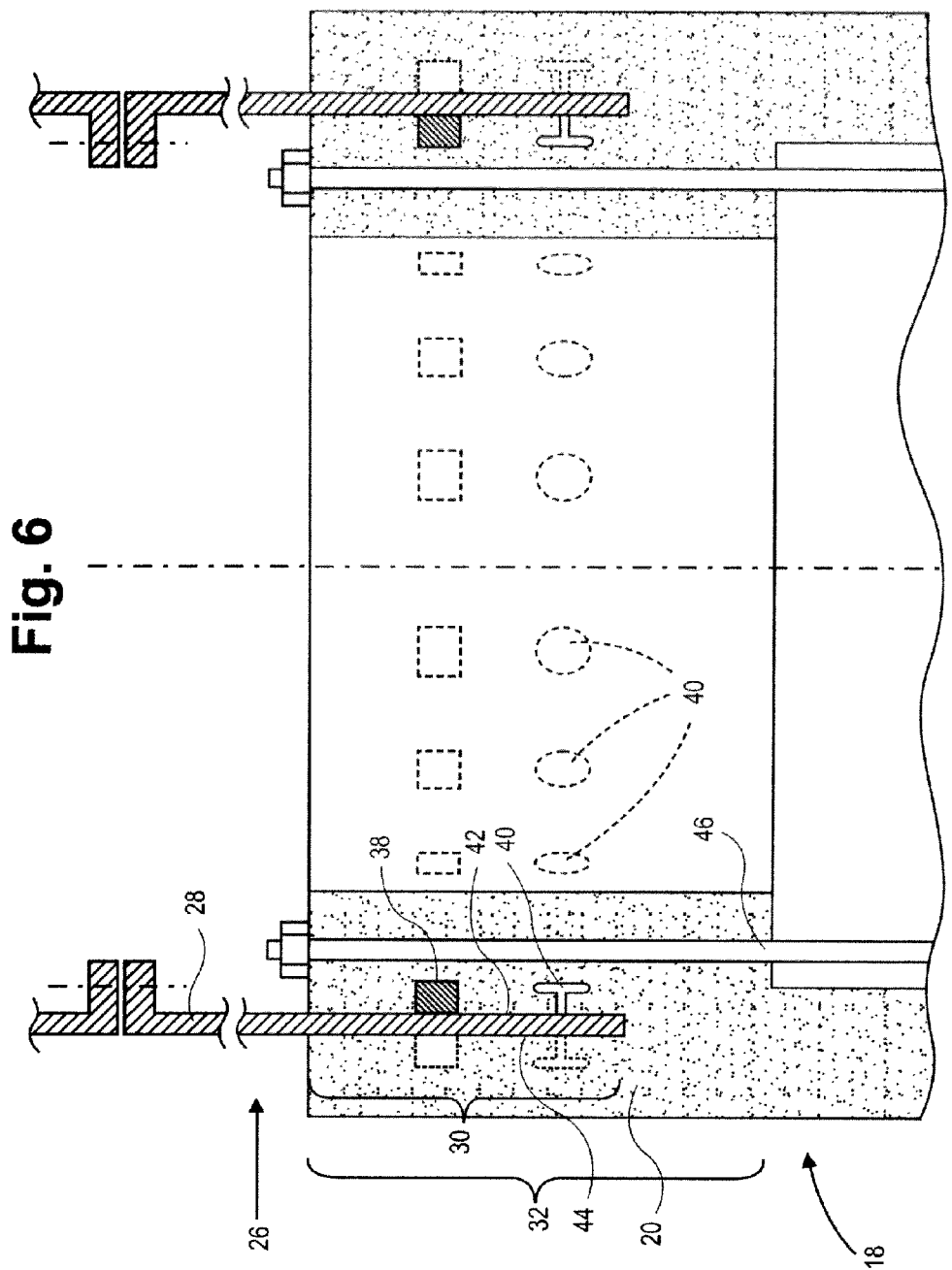

TOWER FOUNDATION, IN PARTICULAR FOR A WIND ENERGY TURBINE

CROSS-REFERENCE TO RELATED APPLICATION

This application is a National Phase Application of, and claims priority to, International Application No. PCT/EP2003/008871, filed 9 Aug. 2003, entitled TOWER FOUNDATION, IN PARTICULAR FOR A WIND ENERGY TURBINE.

BACKGROUND OF THE INVENTION

1. Field of the Invention

The present invention relates to a tower suitable in particular for a wind energy turbine. More specifically, the present invention relates to a hybrid tower including a tower segment comprising concrete material and at least one other tower segment comprising steel. In particular, the present invention is related to the connection between the concrete tower segment and the steel tower segment.

2. Related Prior Art

Towers for supporting diverse elements are well known and used in different technical fields. For example, tubular towers are used to support the nacelle of a wind energy turbine wherein the nacelle is rotatably mounted on top of the tower.

In order to comply with the increasing demand for using regenerative energy resources for electrical power distribution networks, modern wind energy turbines increasing require greater power generation capacity. Further, increasing rotor diameter size of wind energy turbines requires increasing heights of the towers.

Up to a certain height, towers for wind energy turbines can be made from tubular segments of steel. The tubular segments can be cylindrical or conical, or a combination of both types of tubular tower segments can be used.

In order to be able to use tubular tower segments made of steel for relatively high towers, it is known to employ at the base or lower portion of the tower a tubular tower segment made of reinforced concrete. There are basically two known designs for connecting a tubular steel segment to a tubular concrete segment.

One alternative for such a connection is shown. In FIG. 4. According to this design, a reinforced tubular concrete segment 1 having pre-stressing elements 2 connects to a flanged steel segment 3 at its upper end, the steel segment 3 also being tubular. Disposed between the concrete segment 1 and the steel segment 3, there is a gap 4, which needs to be sealed. It is difficult to seal the gap 4 because the dimensions of the gap are likely to fluctuate, particularly when the tower is subjected to radial loads.

Another known design for connecting a tubular steel tower segment to a tubular concrete tower segment is shown in FIG. 5 (in this figure, the same reference numerals as in FIG. 4 are used to refer to similar elements.) The concrete tower segment 1 of this design includes reinforcing elements 5 (reinforcement steel) without any pre-stressing elements. A lower portion of the steel tower segment 3 is embedded in the concrete of the concrete tower segment 1 and includes a flat ring-like anchoring element 6, which is also embedded in the concrete. An outer edge of the anchoring element 6 extends proximally toward an outer surface 7 of the concrete tower segment 1. It is common to observe a formation of cracks 9 due to significant concentration of tension forces within that area 8.

It is an object of the present invention to provide a hybrid tower comprising a tower segment made of concrete and a tower segment made of steel wherein the connection between the segments is improved.

SUMMARY OF THE INVENTION

According to the present invention, a tower is provided, in particular for a wind energy turbine, including a first tower segment having a wall including a concrete material and typically being tubular in shape, and a second tower segment having a wall including steel and typically being tubular in shape, wherein the wall of the second tower segment includes an axial end portion embedded in an embedment portion of the wall of the first tower segment and wherein the second tower segment within its embedded end portion includes at least one anchoring element projecting radially from an inner or an outer surface, or both inner and outer surfaces of the wall of the second tower segment, the anchoring elements being arranged along an axial direction of the second tower element.

One aspect according to the invention relates to an improved ability to handle shear forces in the first tower segment having concrete material (hereinafter referred to as the concrete tower segment). These shear forces result from lateral loads acting on the second tower segment or segments of the tower (hereinafter referred to as the steel tower segment). According to the present invention, shear forces are distributed into the embedment portion of the concrete tower segment that receives the embedded end portion of the steel tower segment. Within the embedded end portion of the steel tower segment a multitude of individual anchoring elements are arranged so as to radially project from the inner or the outer surface or both the inner and outer surfaces of the wall of the steel tower segment. The anchoring elements are arranged adjacent to each other along the axial direction of the tubular steel tower segment.

Due to the distribution of the shear forces from the steel tower segment to the concrete tower segment, significant and, accordingly, undesired tension force concentrations can be prevented. Therefore, a hybrid tower can be obtained without a gap between adjacent steel and concrete tower segments and without the danger of the formation of cracks in the concrete wall of the concrete tower segment.

Instead of being tubular or hollow, the steel tower segment can include at least one and preferably several steel beams embedded at the end or ending in the concrete tower segment.

In yet another embodiment of the present invention, the anchoring elements include headed studs or circumferentially extending annular portions like flanges. Generally, anchoring elements are preferred that have an enlarged free end portion located opposite to the wall of the steel tower segment. In particular, anchoring elements extending along a section of the circumferential direction of the steel tower segment can be used.

Connection of the anchoring elements to the steel wall of the steel tower segment can be performed in various ways. One example is that the anchoring elements are screwed to the wall of the steel tower segment. In yet another embodiment, the anchoring elements are welded to the wall of the steel tower segment. One important aspect concerning the connection between the anchoring elements and the wall of the steel tower segment is that the anchoring elements are fixedly mounted to the wall preventing relative movements therebetween.

The kind of connection between a tubular concrete tower segment and a tubular steel segment according to the present invention can be used for reinforced concrete tower segments which may include pre-stressing elements extending axially through at least the embedment portion of the concrete tower segment. In a tower segment made of reinforced concrete (without pre-stressing elements) the anchoring elements of the steel tower segment can protrude from either the inner or the outer surface or from both surfaces. If a concrete tower segment including pre-stressed concrete having pre-stressing elements is used, the anchoring elements should project from that side of the steel tower segment facing the pre-stressing elements. Due to this arrangement, the anchoring elements interact with the pre-stressed portion of the concrete tower segment which with regard to the distributed introduction of shear forces is advantageous.

BRIEF DESCRIPTION OF THE DRAWINGS

Some of the above indicated and other more detailed aspects of the invention will be described in the following description and partially illustrated with reference to the drawings. As used herein, like numerals throughout the various figures represent the same or equivalent features of the present invention. Therein:

FIG. 2 is an enlarged sectional view of the tower segment connection area marked as section II in FIG. 1, FIG. 3 is another embodiment of section II of FIG. 1, FIG. 4 is a sectional view of a known tower segment connection area, FIG. 5 is another sectional view of a known tower segment connection area, and FIG. 6 is another embodiment of section II of FIG. 1.

DETAILED DESCRIPTION OF PREFERRED EMBODIMENTS

Figure 1:
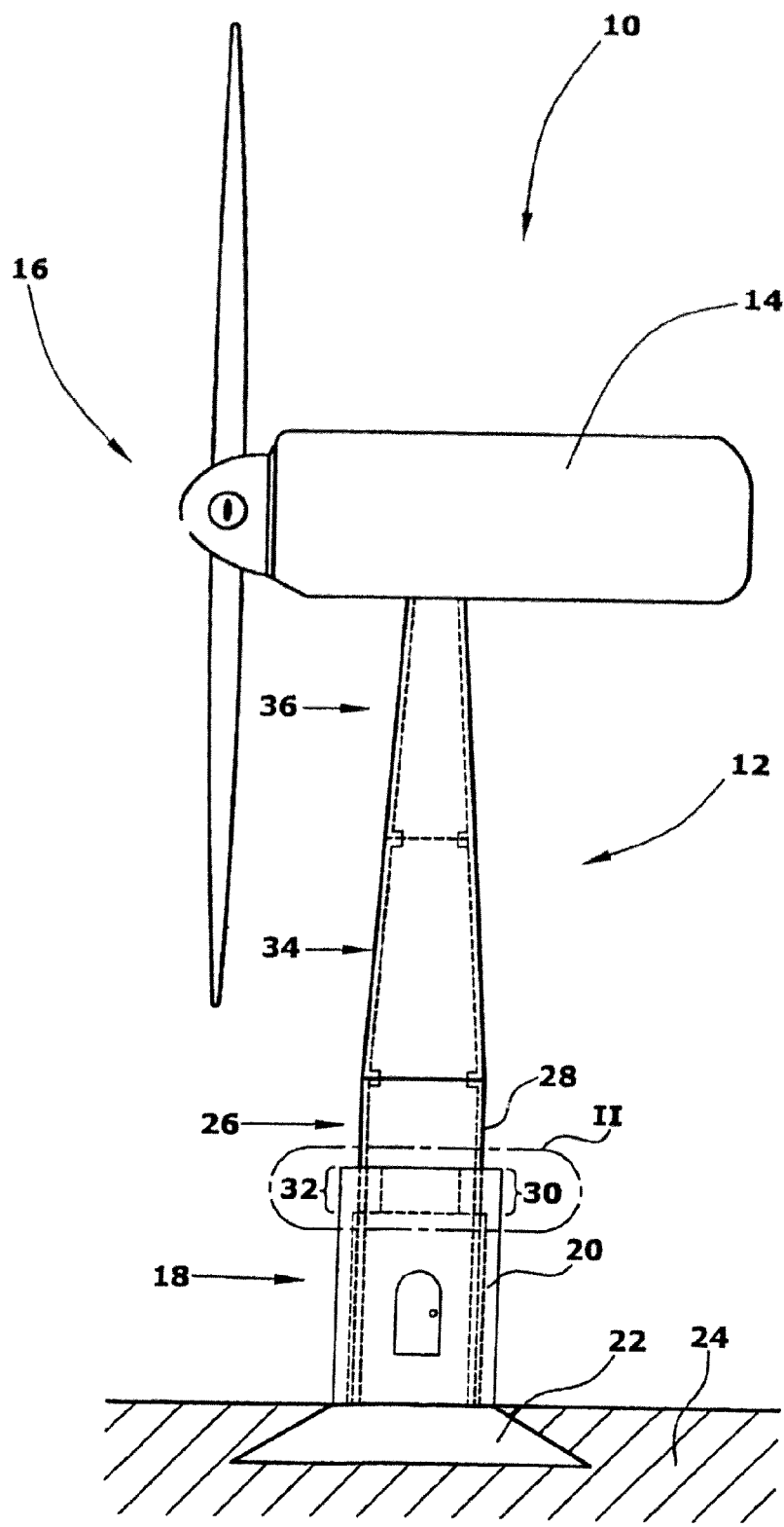
FIG. 1 is a schematic side view of a wind energy turbine provided with a tower, the tower having tower segments connected according to the present invention.

FIG. 1 shows a side view of a wind energy turbine 10. The wind energy turbine 10 includes a tower 12 and a nacelle 14 rotatably arranged on top of the tower 12. The nacelle 14 is provided with a rotor 16 mounted rotatably around a horizontal axis. The nacelle 14 is mounted at the tower 12 while being rotatable around a vertical axis. Although in FIG. 1 a wind energy turbine 10 having a rotor being rotatable around a horizontal axis is shown, the present invention is not limited to such wind energy turbine designs but can also be used in connection with a wind energy turbine having a rotor being rotatable around a vertical axis.

As can be seen from FIG. 1, the tower 12 includes several tubular tower segments. Specifically in this embodiment, a first tower segment 18 including a wall 20 of concrete is arranged at the base portion of the tower 12. As shown herein, the first tower segment is tubular in shape. Moreover, the first tower segment 18 is provided with a foundation portion 22 arranged within the ground 24.

Adjacent to and connected to the first tubular tower segment 18 is located a second tower segment 26 having a wall 28 of steel. As shown herein, the second tower segment is tubular in shape. The lower end portion 30 of the wall 28 of the second tower segment 26 is embedded in an upper embedment portion 32 of the concrete wall 20 of the first tower segment 18. Further details of the embedding arrangement can be seen and will be explained in connection FIGS. 2 and 3.

On top of the second tower segment 26 in this embodiment there are arranged two additional tower segments 34 and 36 each having walls made of steel. The three tower segments 26, 34, and 36 made of steel are connected to each other via flange portions which is basically known to those skilled in the art. While the second tower segment 26 in this embodiment is substantially cylindrical, the two other tubular tower segments 34, 36 made of steel have a conical shape. According to the present invention, the tower segments can have a cylindrical or conical shape, or any other hollow shape and are typically tubular. Of course, the tower segments may also have other geometrical shapes such as squares, rectangles, and the like. It will be understood by those of ordinary skill in the art, however, that tubular shapes are more common and preferred for structural integrity.

A first embodiment of the connection between the first and second tower segments 18 and 26 will be explained in more detail referring to FIG. 2. In FIG. 2 it can be seen that the end portion 30 of the wall 28 of the second tower segment 26 is embedded in the concrete of the embedment portion 32 of the wall 20 of the first tower segment 18. Within the embedded end portion 30 of the wall 28, several anchoring elements 38, 40 of similar or different types project from an inner surface 42 of the wall 28. In this embodiment these anchoring elements 38,40 are welded to the wall 28. However, other ways of attaching the anchoring elements 38,40 to the wall 28 are possible as discussed above. By dashed lines, it is shown in FIG. 2 that anchoring elements can also be arranged at an outer surface 44 of the wall 28. It is to be noted that the anchoring elements 38,40 are distributed along the axial direction of the wall 28 so that within different heights there are arranged anchoring elements 38,40. Anchoring elements 40 are built as headed studs having enlarged free ends opposite the wall 28 from which they project. Several headed studs are arranged along the circumferential direction of the wall 28. Another type of anchoring element is shown at 38, which represents an annular portion extending along the circumferential direction of the wall 28. As an alternative, instead of a closed annular portion, the anchoring elements 38 can also be designed as sections of an annulus as illustrated in FIG. 6.

Moreover, in FIG. 2 it is shown that the wall 20 of the first tower segment 18 includes pre-stressed concrete having pre-stressing elements 46 extending at least through the embedment portion 32 of the wall 20. The pre-stressing elements 46 are arranged adjacent to the inner surface 42 of the wall 28 of the second tower segment 26. Due to the internal pressure and tension that the embedment portion 32 of the concrete wall 20 at the side of the anchoring elements 38,40 is subjected to, the anchoring properties and shearing force characteristics of the tower segments 18,26 is improved.

An alternative embodiment of the connection between the tower segments 18 and 26 is shown in sectional view in FIG. 3.

One difference between the embodiments of FIGS. 2 and 3 relates to the fact that the wall 20 of the first tower segment 18 according to the embodiment of FIG. 3 is reinforced by reinforcing elements 50. No pre-stressing elements are provided in the wall 20 of the first tower segment 18 of FIG. 3.

In the embodiment of FIG. 3, anchoring elements 38,40, and 52 are positioned on both inner and outer surfaces 42,44 of the wall 28. Also another embodiment of anchoring elements 52 is shown in FIG. 3. The anchoring elements 52 are designed as an L-shaped flange welded or attached to the wall 28.

According to the embodiments of the present invention shown in FIGS. 2 and 3 and as described above, shear forces acting between the tower segments 18 and 26 are distributed along the embedded end portion of the steel tower segment 18 into the concrete wall 20. By distributing the concentrations of forces and tensions in this way, shear forces can be prevented within the embedment portion 32 of the wall 20 of the first tower segment 18. According to the present invention, the advantages of an embedment of the comparatively thin steel wall within the concrete wall 20, namely preventing the existence of a horizontal gap, can be used without risk of generating cracks because the internal forces concentrated within the concrete wall 20 can be prevented due to the distributed shear connection concept as shown and described herein.

Although the present invention has been described and illustrated with reference to specific illustrative embodiments thereof, it is not intended that the invention be limited to those illustrative embodiments. Those skilled in the art will recognise that variations and modifications can be made without departing from the true scope of the invention as defined by the claims that follow. It is therefore intended to include within the present invention all such variations and modifications as fall within the scope of the appended claims and equivalents thereof.

The invention claimed is:

1. A tower, comprising:
   a first tower segment having a wall comprising concrete material and
   a second tower segment having a wall comprising steel,
   wherein the wall of the second tower segment comprises an end portion embedded in an embedment portion of the wall of the first tower segment,
   wherein the second tower segment within its embedded end portion comprises a plurality of separate anchoring elements projecting radially from at least one of the side surfaces of the wall of the second tower segment, the plurality of anchoring elements being fixedly mounted to at least one of the side surfaces of the wall of the second tower segment and being arranged along an axial direction of the second tower segment to prevent internal force concentrations within the wall of the first tower segment, and
   wherein the plurality of anchoring elements comprises a first type of anchoring elements having an enlarged free end portion and a second type of anchoring elements having annular portions that are only in contact with either one of the side surfaces of the wall of the second tower segment, wherein the first type of anchoring elements are different than the second type of anchoring elements.

2. The tower according to claim 1, wherein the first tower segment is tubular.

3. The tower according to claim 1, wherein the second tower segment is tubular or comprises at least one beam.

4. The tower according to claim 1, wherein each of the first type of anchoring elements having the enlarged free end portion comprises a headed stud.

5. The tower according to claim 1, wherein the first type of anchoring elements extend contiguously in a circumferential direction of the second tower segment.

6. The tower according to claim 5, wherein the second type of anchoring elements having at least sections of annular portions extend along the circumferential direction of the second tower segment.

7. The tower according to claim 1, wherein the plurality of anchoring elements are welded to the wall of the second tower segment.

8. The tower according to claim 1, wherein the wall of the first tower segment further comprises a reinforcement element in at least its embedded end portion.

9. The tower according to claim 8, wherein the wall of the first tower segment comprises pre-stressed concrete in at least its embedded end portion.

10. The tower according to claim 9, wherein the wall of the first tower segment comprises pre-stressing elements axially extending through at least the embedment portion and arranged so as to face the inner surface or the outer surface of the embedded end portion of the second tower segment.

11. The tower according to claim 10, wherein the plurality of anchoring elements are arranged at the surface of the embedded end portion of the wall of the second tower segment adjacent to the pre-stressing elements of the first tower segment.

12. The tower according to claim 1, wherein the second tower segment within its embedded end portion further comprises a second plurality of anchoring elements projecting radially from an outer surface of the wall of the second tower segment.

13. The tower according to claim 12, wherein the second plurality of anchoring elements comprise the first type of anchoring elements.

14. The tower according to claim 13, wherein each of the first type of anchoring elements having the enlarged free end portion comprises a headed stud.

15. The tower according to claim 12, wherein the first type of anchoring elements extend contiguously in a circumferential direction of the second tower segment.

16. The tower according to claim 15, wherein the second plurality of anchoring elements comprise the second type of anchoring elements having at least sections of annular portions, and wherein the second type of anchoring elements extend along the circumferential direction of the second tower segment.

* * * * *